(No Model.)
J. H. SHAW.
SNAP HOOK.
No. 553,432.    Patented Jan. 21, 1896.
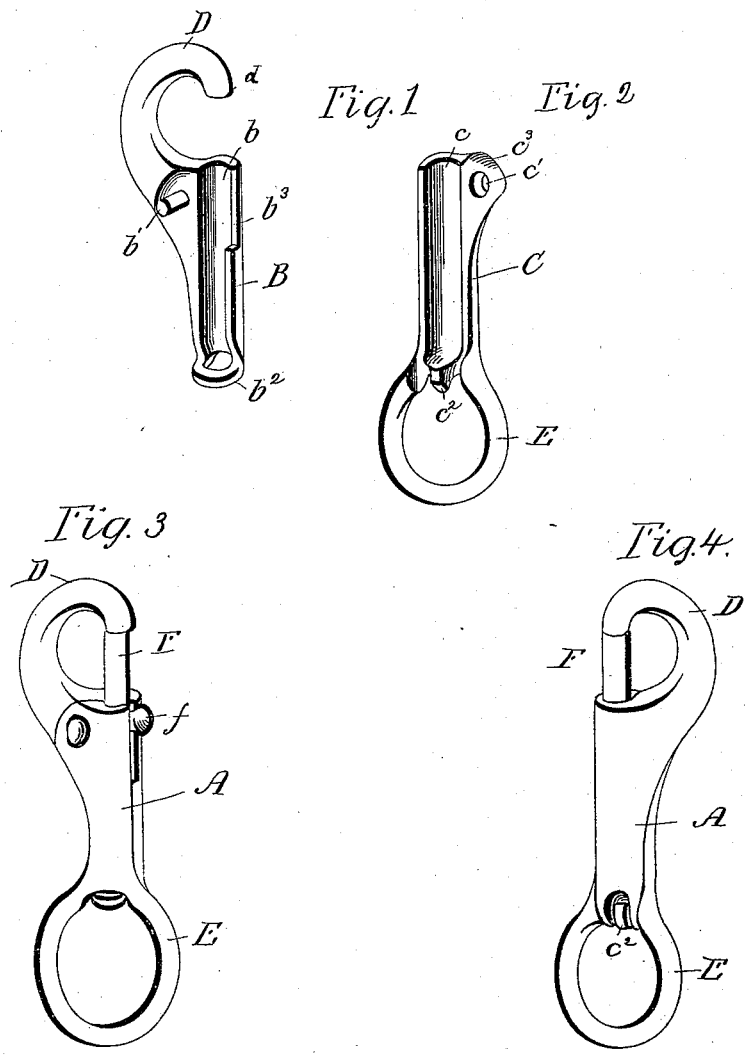
Witnesses:
Chas. B. Shumway
Samuel York Jr.
Inventor
John H. Shaw
by Robinson Fisher
his attorneys

UNITED STATES PATENT OFFICE.

JOHN H. SHAW, OF NEW HAVEN, CONNECTICUT, ASSIGNOR TO THE SARGENT & COMPANY, OF SAME PLACE.

SNAP-HOOK.

SPECIFICATION forming part of Letters Patent No. 553,432, dated January 21, 1896.

Application filed April 13, 1895. Serial No. 545,625. (No model.)

*To all whom it may concern:*

Be it known that I, JOHN H. SHAW, a citizen of the United States, and a resident of the city of New Haven, in the county of New Haven, State of Connecticut, have invented a new and useful Improvement in Snap-Hooks, which is fully described in the following specification, taken in connection with the drawings, which form a part thereof, and in which—

Figure 1 is a perspective view of one portion of the shank, together with the hook; Fig. 2, a perspective view of another portion of the shank, together with the eye; Fig. 3, a view of the parts assembled, forming a completed hook; and Fig. 4, the reverse of Fig. 3.

The same letters of reference represent like parts in all figures.

This invention relates to hooks of the class known as "snap-hooks," in which the shank is of tubular form, having a hook at one end and an attaching device at the opposite end, the tubular shank forming a socket in which a longitudinally-movable bolt and spring are arranged, the tendency of the spring being to force the bolt forward into engagement with the nose of the hook to close the opening into the hook, the tubular shank being constructed with a longitudinal slot at its forward end, through which a thumb-piece or button projects from the bolt and by which thumb-piece the bolt may be moved to open the hook.

The object of this invention is a construction which will permit the tubular shank to be formed by casting, so that little or no mechanical work other than that of the mere assembling of the parts is required in the manufacture of the hook, and to accomplish this object the tubular shank is cast in two parts (without the need of a core) secured together by means to be described hereinafter, thereby producing a cheap yet thoroughly-effective hook, all of which is fully set forth and claimed hereinafter, together with minor improvements.

In the drawings, A represents the tubular shank into which are arranged a bolt F (see Fig. 3) and spring, (not shown,) the tension of which constantly presses the bolt against the nose $d$ of the hook D.

E represents the eye, loop, swivel, or other device for uniting the hook to the strap or other article.

A small button $f$ acts as a thumb-piece for operating the bolt and has a longitudinal play in the slot $b^3$.

The method of constructing this hook illustrating this invention is as follows: The tubular shank A is divided longitudinally in the plane of the hook into two parts which are cast separately, the one, B, integral with the hook D, the other, C, integral with the eye E. In casting the part B, a substantially U-shaped groove $b$ is formed therein, extending longitudinally with the shank and having one side cut away at $b^3$ to form the slot, Fig. 3, for the play of the button or thumb-piece $f$ for operating the bolt. Upon the part C of the shank is also formed a groove $c$, the two grooves $b$ and $c$ forming together the cylindrical socket for the bolt and spring. At the base of the hook D is the laterally-extending lug $b'$ adapted to fit into a registered hole $c'$ on the lip or extension $c^3$ formed on the upper end of the portion C of the shank. At the lower end of the part B of the shank is the transversely-projecting loop $b^2$, so that there may be introduced therein the longitudinally-extending lug $c^2$ at the base of the part C projecting into the eye E.

When the two parts described above and shown in Figs. 1 and 2 have been cast, the bolt F (which may have the button $f$ cast integral therewith) and spring are arranged in the groove $b$ and the lug $c^2$ inserted in the loop $b^2$. The part C is then placed on the part B to allow the lug $b'$ to project through the hole $c'$. Upon riveting the lug $b'$ to engage the part C the various parts of the article are assembled and securely held together. The parts of this invention are simple for casting, and the merest expenditure of time and labor is required to assemble the parts and rivet the single lug $b'$. On the other hand the article produced is practically as strong and serviceable as if the tubular shank had been cast entire, or a more complicated method used in the assembling and securing of the various parts.

Without departing from the spirit of my invention the formation of the parts may be reversed and the grooves in the two parts of the shank may be equalized.

I am aware that loops have been used in assembling the parts of a snap-hook, and I do not claim that broadly.

What I claim is—

1. A bolt snap hook comprising a loop and hook section, and an intermediate body or barrel portion formed in two sections, each constituting substantially one-half of the barrel, a lateral loop formed at the loop end of one section, a longitudinal lug formed on the loop end of the companion section and fitted in the lateral loop, a perforated lateral lip at the hook end of one section and an integral lateral lug located beyond and at one side of the hook end of the other section entering the perforation of the lip and secured therein, substantially as described.

2. A bolt snap hook consisting of loop and hook sections, and a barrel portion formed in two sections carrying respectively the loop and hook, a lateral loop on the loop end of the hook section, a longitudinal extension on the loop section entering the lateral loop, a lateral lug at the base of the hook, and a perforated lateral lip on the hook end of the loop section projecting over the lateral lug and in which the latter is secured, substantially as described.

In witness whereof I have hereunto set my hand this 5th day of April, 1895.

JOHN H. SHAW.

Witnesses:
E. R. SARGENT,
CLAIRE E. PLATT.